United States Patent [19]
Puski

[11] 3,843,802

[45] Oct. 22, 1974

[54] PROTEINACEOUS MATERIAL FOR BEVERAGE USE AND METHOD

[75] Inventor: Gabor Puski, Hanover Park, Ill.

[73] Assignee: Central Soya Company, Inc., Fort Wayne, Ind.

[22] Filed: Oct. 1, 1971

[21] Appl. No.: 185,842

[52] U.S. Cl. .................................. 426/46, 426/190
[51] Int. Cl. .......... A23l 1/02, A23l 1/20, A23j 3/00
[58] Field of Search .......... 195/28 R; 99/14, 17, 18, 99/20, 78, 79, 28; 426/46, 166, 212, 364

[56] References Cited
UNITED STATES PATENTS

| | | | |
|---|---|---|---|
| 1,237,723 | 8/1917 | Stein | 99/28 |
| 2,489,208 | 11/1949 | Turner | 99/17 |
| 3,391,001 | 7/1968 | Sair | 99/18 |
| 3,640,723 | 2/1972 | Uhlig et al. | 99/98 X |
| 3,645,745 | 2/1972 | Magnino et al. | 260/123.5 X |
| 3,689,279 | 9/1972 | Bedenk | 99/17 X |
| 3,694,221 | 9/1972 | Hoer et al. | 99/17 |
| 3,713,843 | 1/1973 | Pour et al. | 99/17 |

*Primary Examiner*—Raymond N. Jones
*Assistant Examiner*—R. B. Penland
*Attorney, Agent, or Firm*—Dawson, Tilton, Fallon & Lungmus

[57] ABSTRACT

A proteinaceious product suitable for incorporation into beverages which is characterized by being readily dispersible and soluble in acidic fluids, further characterized by the substantial absence of deleterious flavors and constituting a substantial part of the protein source.

2 Claims, No Drawings

PROTEINACEOUS MATERIAL FOR BEVERAGE USE AND METHOD

BACKGROUND OF INVENTION

Many soft drinks both of the carbonated and non-carbonated variety could be improved significantly in nutritional value by the addition of protein. Such beverages are consumed in large quantity but at present are of less than optimum nutritional value. A real problem has existed in the incorporation of proteins into these fruit, cola, etc., type drinks in the inability of proteins to be dissolved in acidic media. Not only is there the solubility problem but also there is a further and real problem from the standpoint of the bottler and user in the fact that many protein variants have undesirable flavor characteristics. Still further there is a practical problem in that the nutritional element must be relatively inexpensive to justify its inclusion, viz., be readily producible in high yield from a relatively inexpensive protein source.

SUMMARY OF INVENTION

The invention provides a proteinaceous material having the characteristics above identified and illustrates typical procedures for the provision of such material. More particularly, the proteinaceous product which is incorporatable into soft drinks is substantially completely soluble in acidic media, i.e., those having pH's in the range of about 2 to about 5.5. The material not only is soluble but is further readily dispersible and is produced by the controlled enzymatic partial hydrolysis of a protein source. This results in a product having an N-terminal free amino acid group content in the range of about 0.125 to about 0.225 per 100 grams of protein, and characterized by a relatively low viscosity and the substantial absence of both color and undesirable flavor components.

DETAILED DESCRIPTION OF INVENTION

A wide variety of protein sources may be employed. Optimally, the first step is to concentrate the protein fraction utilizing the most efficient commercially available procedures. For example, the protein source may be of animal origin such as casein or FPC (fish protein concentrate); plant origin or microbiological origin. Optimum results are obtained when using an oilseed such as soybeans wherein the protein fraction is advantageously concentrated. Other suitable plant sources include such oilseeds as cottonseeds and sunflower seeds, cereals such as wheat and corn, and leaf protein. Suitable procedures for the concentration of such microbiological protein sources as single cell proteins and algal proteins may be found in "Single cell Proteins" by R. I. Mateles and R. Tannenbaum, MIT Press 1968.

In the foregoing reference to a protein from a soybean source, the protein was provided in the form of a curd. The protein source, viz., the concentrated or separated moiety may take alternative forms such as flour, extracts, concentrate, or protein isolates. In certain instances, a portion of the whey may also be retained in the curd. Illustrative of an advantageious practice of the invention in providing the ultimate proteinaceous material is the following examples.

EXAMPLE I

Soybean meal was extracted with mild alkaline solution (pH 8–9, 1:20 meal to solvent ratio). The aqueous extract was separated from the insoluble residue by centrifugation (alternatively, other suitable means could be employed). The globular proteins were then precipitated by adjusting the pH to 4.5 with suitable food grade acids, preferable HCl, and were removed by centrifugation. The precipitated proteins were washed once, then heated to 80° C. This protein slurry preferably should contain about 15 percent total solids, but this may vary as desired. Thereafter 0.006 lbs. of Papain AS-400 enzyme (Wallerstein Company) and 0.001 lbs. of sodium bisulfite was added for each lb. of protein in the above slurry. Sodium bisulfite may be replaced with appropriate quantities of other acceptable reducing agents, such as cysteine, sodium hydrogen sulfite, sodium sulfite, etc. If the reducing agent is eliminated completely, the yield will be lower.

The protein-enzyme slurry was mixed for 2 hours at 80°C. Longer digestion time gives only slightly increased yield.

After the 2 hours digestion time, the protein slurry was heated to boiling to inactivate the enzyme, and the insoluble proteins were removed by centrifugation (other suitable means such as filtration or pressing settling may be employed). The spray-dried supernatant may be used as such as a protein additive in soft drinks, juices, various carbonated and non-carbonated beverages.

The acid insoluble residue may be dried as is, or after neutralization with NaOH, or treated any desired way depending on various end use desired. When the spray-dried acid soluble protein was added to beverages, preferably in the 1–3 percent protein range, it produced no objectionable off-flavor, color or textural response.

In the instant example, the partially hydrolyzed soy protein had a free amino acid value of 0.028 per 100 g. of protein according to the determination of free amino groups in proteins by TNBS. A.F.S.A. Habeeb, Analytical Biochemistry 14, 328–336, 1966.

Two types of free amino acid groups can be distinguished in proteins: (a) Amino groups of certain amino acid residues in peptide change, i.e., amino group of lysine; and (b) N-terminal acid amino groups. In unhydrolyzed proteins for former predominates, and there are only a few N-terminal amino acids per protein molecule. Upon hydrolysis of a peptide bond, an amino and a carboxyl group are formed. Thus for each peptide bond hydrolyzed, the number of free amino groups per unit is increased. Thus, increase in number of free amino groups is directly related to the extent of hydro-

TABLE

| Results: Sample | No. of Free $NH_2$/100g Protein (Ave. values) | Increase in Free $NH_2$/ 100g Protein |
|---|---|---|
| PROMINE D | 0.066 | — |
| Bacto Soytone (Difco) | 0.268 | 0.202 |
| Phytone (BBL) | 0.310 | 0.244 |
| Acid Soluble Soy | 0.208 | 0.142 | lysis. Determination of free amino groups in acid soluble soy proteins and papain digests of soybean meal for bacteriological media were used to compare the extent of hydrolysis in the products.

Thus, the acid soluble soy protein is prepared by a less extensively hydrolyzed, controlled process, as compared to Phytone and Soytone. Significantly, it has less off-flavor and color.

EXAMPLE II

The procedure of Example I was followed but with the drying step eliminated. The acid soluble protein solution obtained in Example I can be used directly to formulate various beverages, by the addition of other ingredients required for a given beverage.

EXAMPLE III

In the further practice of the invention, we take protein sources from a variety of origin materials, viz., Casein, fish protein concentrate, cottonseeds, sunflower seeds, wheat gluten, corn, leaf protein, single cell proteins, and algal proteins and first subject the protein source material to a pretreatment to prevent microbial spoilage. Thereafter, the pretreated protein source is subjected to enzymatic digestion followed by separation of the liquid and solids components for incorporation into a soft drink beverage.

EXAMPLE IV

The invention is further practiced by taking a protein source material and after pretreatment to prevent microbial spoilage, is subjected to enzymatic digestion utilizing the following proteolytic enzymes either individually or in combination with each other: pepsin and pancreatin so as to represent animal sources, papain and ficin to represent vegetable sources and a fungal and bacterial proteases to represent enzymes of microbial origin. The digest is again separated and incorporated into a beverage.

In the practice of the invention to provide the proteinaceous material, the pretreated substrate is suspended in water and the pH is advantageously adjusted to the optimum pH range of the enzyme. Thereafter the enzyme is added and the mixture is incubated at the optimum temperature for the enzyme used. Variations in the quantity of the enzyme used are dependant upon the purity of the enzyme and concentration of the substrate.

More specifically, when the invention is employed with soybean meal, an acid curd of soybean proteins is prepared by known processes with the curd being treated to reduce microbiological contamination, preferably by heating. In the illustration given with respect to soybean material, solubilization of a major portion of the curd at acidic pH's is achieved by treatment with papain enzyme. Various other proteolytic enzymes such ficin, fungal proteases, bacterial proteases, pepsin, etc., may be substituted for papain. In each case the pH, temperature, length of digestion and enzyme concentration is adjusted to optimum conditions required by the given enzyme. It will be appreciated that various other forms of soybean moieties may be employed such as soybean flour, concentrate, grit, and subjected to enzyme treatment. The invention also contemplates the use of other commercially available protein sources such as sodium caseinate, wheat gluten, FPC, microbial protein, etc.

As can be appreciated from the foregoing examples, a variety of separation procedures may be employed for separating the solublized proteinaceous material from the solids. If not all of the protein is solubilized, then the soluble portion can be separated by adjusting the pH of the mixture to the isoelectric point of the protein, or to any pH where the undigested protein stays insoluble, and by removing the insoluble protein by centrifugation, filtration, settling or other conventional methods.

Inactivation of the enzyme can be achieved also through heating, exposure to extreme pH (i.e., high acidity) as well as by the addition of oxidizing agents (i.e., hydrogen peroxide) or by any other known means. The solublized protein may be used directly for food formulations or first concentrated or dried.

Through the partial hydrolysis of the peptide bonds, the size of the protein molecules is reduced whereby they become water soluble at any pH, particularly acidic pH's in the range of about 2 to about 5.5. The hydrolysis is partial, i.e., limited so as to avoid developing either off-flavor or destroying the nutritional characteristics of the proteins. For optimum yields, we prefer to employ a substrate concentration for enzymatic treatment which has a protein concentration in the range of about 5 to about 30 percent.

I claim:

1. A process for treating a protein material selected from the class consisting of soybean protein, sodium caseinate, wheat gluten, fish protein concentrate, and microbial protein to produce an acid-soluble product and incorporating said product into beverages consisting essentially in the steps of forming an acid protein curd from said protein material, heating said curd for a period of time sufficient to reduce microbiological contamination, forming a slurry of said curd and mixing it with a sufficient amount of proteolytic enzyme selected from the class consisting of a ficin, fungal proteases, bacterial proteases, pepsin, and papain to render soluble at an acidic pH a major portion of said curd by adjusting the pH, temperature and enzyme concentration, of said slurry and continuously mixing the protein-enzyme slurry for a predetermined time up to about two hours, thereby producing a product having an N-terminal free amino acid group content in the range of about 0.125 to about 0.225 per 100 grams of protein, heating the protein-enzyme slurry after said predetermined time to a temperature sufficient inactivate said proteolytic enzyme, separating insoluble protein from said slurry, drying said soluble protein curd, and incorporating from about 1 percent to about 3 percent of said soluble protein in a beverage having a pH in the range of about 2 to about 5.5.

2. A process for treating a soybean protein material to produce an acid soluble product and incorporating said material into beverages consisting essentially of forming an acid protein curd from said soybean material, heating said curd for a period of time sufficient to reduce microbiological contamination, forming a slurry of said curd and mixing papain in an amount of about 0.006 pound per pound of protein material, adjusting the pH to about 4.5 and the temperature to about 80°C, continuously mixing the protein-papain slurry for about 2 hours, thereby producing a product having an N-terminal free amino acid group content in the range of about 0.125 to about 0.225 per 100 grams of protein, heating the protein-papain slurry after said two-hour period to a temperature sufficient to inactivate said papain, separating the insoluble protein from said slurry, drying the soluble protein, and incorporating from about 1 percent to about 3 percent of said soluble protein in a beverage having a pH in the range of about 2 to about 5.5.

* * * * *